N. PRÖSTLER.
METHOD AND APPARATUS FOR UNITING TOGETHER PIECES OF BRASS, ALUMINIUM, AND SIMILAR METALS OR ALLOYS BY ELECTRIC RESISTANCE HEATING.
APPLICATION FILED MAY 26, 1915. RENEWED JAN. 14, 1920.

1,351,684.

Patented Aug. 31, 1920.

Inventor
Norbert Pröstler

By
Attorneys

UNITED STATES PATENT OFFICE.

NORBERT PRÖSTLER, OF BERLIN, GERMANY, ASSIGNOR, BY MESNE ASSIGNMENTS, TO THE CHEMICAL FOUNDATION, INC., A CORPORATION OF DELAWARE.

METHOD AND APPARATUS FOR UNITING TOGETHER PIECES OF BRASS, ALUMINIUM, AND SIMILAR METALS OR ALLOYS BY ELECTRIC-RESISTANCE HEATING.

1,351,684.     Specification of Letters Patent.     Patented Aug. 31, 1920.

Application filed May 26, 1915, Serial No. 30,573. Renewed January 14, 1920. Serial No. 351,494.

*To all whom it may concern:*

Be it known that I, NORBERT PRÖSTLER, engineer, a subject of the King of Bavaria, residing at Berlin, in the Empire of Germany, have invented certain new and useful improved methods and apparatus for uniting together pieces of brass, aluminium, and similar metals or alloys by electric-resistance heating, of which the following is a specification, reference being had therein to the accompanying drawing.

My invention relates to a method of, and apparatus for, uniting pieces of brass, German silver, aluminium and other metals or alloys having the property of not becoming like iron or steel very gradually soft and more and more plastic before melting or being fused, *i. e.* getting into the liquid condition,—but of passing over quite suddenly, *i. e.* within a very small interval or range of temperature, into the liquid or molten state without assuming during this passage from a solid into a liquid state a pasty or dough-like condition. Now, brass being a typical representative of materials having the above mentioned properties, I wish it to be well understood that, when in the following specification and in the claims I shall speak of brass, all other alloys or metals having the same properties will be meant as equivalents for brass.

The process forming the object of the present invention consists broadly speaking in subjecting the brass pieces to be welded to a gradually increasing electrode-pressure before the electric welding current enters into action, and, when the welding circuit is closed and the metal at the place of welding gets molten or fused, exerting a stronger pressure upon the brass pieces so as to press the fused metal particles into one another and to afford a more perfect uniting, *i. e.* a stronger connection than with the help of the methods at disposal or available up to the present. More especially, according to the present novel process of welding brass and similar metals, I exert before the welding, *i. e.* before the welding circuit of the machine for electric welding based on the resistance principle used is closed and, after the welding circuit is closed, during the time necessary for bringing the metal to melting or fusion at the place of welding, *i. e.* where the metal parts are in mutual contact, the small welding or electrode-pressure necessary for brass according to the processes forming the objects of my U. S. Letters Patent No. 1,126,655 of Jan. 26, 1915, and No. 1,134,007 of March 30, 1915, and subsequently I increase the pressure sufficiently in order to intimately press together the contacting metal parts at the place of welding so that the uniting or joining is rendered more perfect.

As will be readily understood, the novel method forming the object of the present invention is capable of a quite general application, *i. e.* the same may for example be used as well for uniting the overlapping edges of brass sheets like in the method of my U. S. Letters Patent No. 1,126,655 as for joining the abutting edges of brass sheets like in the method forming the object of my U. S. Letters Patent 1,134,007.

My improved process may be carried out in such a way that in the first stage of the welding operation a yielding electrode-pressure is imparted to the brass parts to be welded with the machine employed for effecting the welding, and in the second part of the operation the yielding pressure is transformed into a non-yielding pressure, which, if desired, may last only a short time and amount to a blow-like stroke or impact similar to the action of a hammer.

Practically, I may provide the welding machine suitable for performing my novel process with a contrivance which during the said first stage of the welding exerts a pressure upon the upper electrode-arm or stake with the help of a spring, while during the second step of the welding said contrivance exerts its action upon the said upper electrode-arm or stake by means of a rigid member, which may for example consist of a step or other suitable device. Preferably, I combine the arrangement adapted for carrying out my improved process with a suitable pedaling device for moving or pressing down the upper electrode against the fixed lower electrode.

Figure 1:
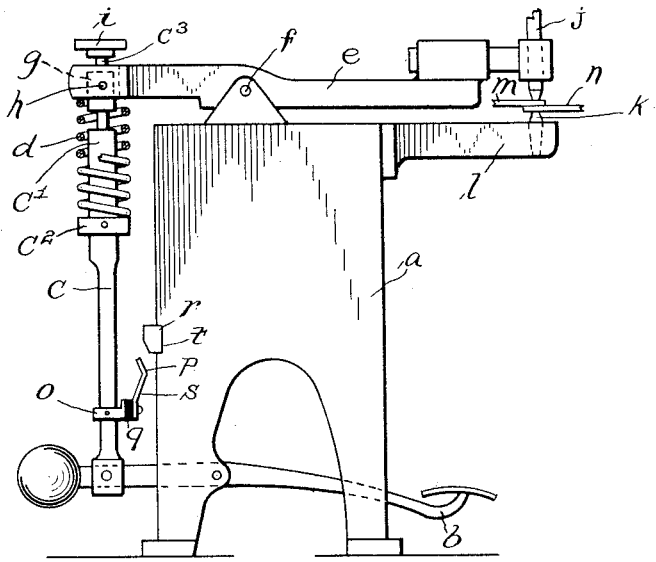
Figure 1 shows the pedaling device in such a position that the electrodes are already closed, *i. e.* squeezing between them the work-pieces to be welded, the circuit-closer or switch subjected to, or displaceable in, an upward direction under the action of the pedaling device being open.
Figure 2:
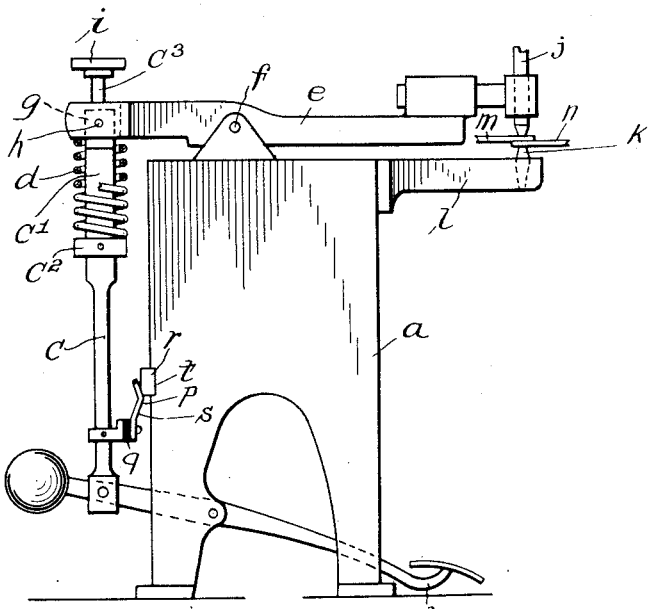
Fig. 2 shows the circuit-closer or switch in its closed position.

In the figures of the drawing $a$ represents schematically the frame of a welding machine to which is fulcrumed the usual weighted pedal or foot-lever $b$ which, when acted upon by the foot, displaces upwardly a rod $c$ carrying the movable member of the circuit-closer or switch, said rod being adapted to press upon the posterior part of the upper fulcrumed electrode-arm or stake by means of a yielding member consisting preferably of a helical spring or coil. In the Figs. 1 and 2 the rod $c$ is pivoted at its lower part to the foot-lever $b$. The upper enlarged portion $c^1$ of the rod $c$ carries a helical spring or coil $d$ resting with its lower end against a flange or shoulder $c^2$ of said rod $c$, while the upper end of the coil $d$ presses upon the inferior part of the rear end of the electrode-arm $e$ fulcrumed at $f$ to the frame $a$ of the electric welding machine.

Figure 3:
Fig. 3 is a detail view.

The upper part $c^3$ of the rod $c$, which is of smaller diameter than the portion $c^1$ of said rod $c$, passes through a block $g$ preferably of cubic or prismatic form (Figs. 2 and 3) and pivoted to the electrode-arm $e$ by means of lateral trunnions $h$ (Fig. 3). Further, the upper end of the portion $c^3$ of the rod $c$ carries a device $i$ which can be used for regulating the tension of the coil $d$, i. e. its pressure upon the lower part of the rear end of the electrode-arm $e$ as by a block $g$ through which the portion $c^3$ threads.

In view of the present invention it is of great importance that the upper surface of $c^1$ be set at a proper predetermined distance from the lower surface of said block $g$. Upon this distance the moment, at which the original yielding electrode-pressure is transformed into a stronger non-yielding pressure is dependent, as will be more fully described later on. The electrode-arm $e$ carries at its front end a pin-shaped electrode $j$ as usual for spot welding. The lower pin-shaped electrode $k$ is carried in a usual way by the lower electrode-arm $l$ connected to the frame $a$ of the machine. Between the electrodes $j$, $k$ are to be placed the work-pieces $m$, $n$ to be welded, which may for example consist of overlapped sheets of brass. Of course, the work-pieces may for example be set between the electrodes with their edges abutting together in the direction of the vertical plane of the electrodes according to the method disclosed in my U. S. Letters Patent No. 1134007, March 30, 1915.

To the lower part of the rod $c$ is connected a bracket $o$ carrying the movable member $p$ of the circuit-closer or switch, said member $p$ being insulated from the bracket $o$ by suitable means, for example a plate $q$ of fiber or other insulating material. The non-movable member or contact $r$ of the circuit-closer is fixed to the frame of the machine; $s$ and $t$ are the current leads.

The operation of the above described device for carrying out my improved method of brass welding is as follows:

After the work pieces have been inserted between the electrodes and the upper electrode pressed upon the work by lowering the upper electrode-arm, the circuit-closer $p$, $r$ being still open (Fig. 1), the foot-lever $b$ is further lowered by pressing with the foot upon the pedal. As soon as the movable member of the circuit-closer contacts with the non-movable member $r$ of same, the electric welding circuit is closed and the electric current transformed into heat at the welding place causes the fusing or melting of the brass parts contacting together. At a determined moment the part $c^1$ of the rod $c$ strikes with its upper portion against the lower part of the block $g$. In consequence thereof the electrode-pressure which was up to this stage of the process a yielding pressure like in the usual welding machines is transformed into a non-yielding pressure; in other words, a rigid connection is now formed between the rod $c$ and the upper fulcrumed electrode-arm $e$, so that a very strong pressure can now be imparted to the work pieces by means of the upper electrode by further lowering the pedal. By this non-yielding or rigid pressing action which can be exerted during the proper time the work-pieces are squeezed together with an adequate final non-yielding pressure different from the original yielding pressure. The non-yielding pressure may be a blow-like pressure similar to the action of a hammer, but this is not a condition for the success, the essential moment being the said transformation of the pressure applied to the work-pieces.

Of course, in performing my improved method or process I am in no way limited to the use of the described arrangement of parts, and I consider myself clearly entitled to all such changes and modifications as fall within the limit and scope of the appended claims.

I claim:—

1. The method of uniting brass pieces by electric resistance heating, which consists in subjecting the brass pieces to be united to a gradually increasing yielding electrode-pressure, closing the electric welding circuit, and, when a fusion has been produced by the electric current at the place of welding, transforming said gradually increasing electrode pressure acting upon the brass pieces into a non-yielding pressure adapted to render the uniting of said brass parts more perfect.

2. The method of welding brass by electric resistance heating, which consists in overlapping brass sheets, subjecting said overlapped brass sheets to a gradually increasing yielding electrode pressure, leading to the contacting surfaces an electric current sufficient to effect a melting or fusing at the place of contact between the sheets, and changing said gradually increasing yielding pressure to a stronger non-yielding pressure adapted to efficiently unite said overlapped brass sheets at the fused or melted place.

3. In an apparatus for welding brass by electric resistance heating, means for exerting first a gradually increasing yielding pressure upon the brass parts to be united, an electric welding circuit, means for closing the electric welding current, and means for transforming the gradually increasing yielding pressure upon said brass parts into a non-yielding pressure adapted to render the uniting more perfect.

In testimony whereof I have affixed my signature in presence of two witnesses.

NORBERT PRÖSTLER.

Witnesses:
WOLDEMAR HAUPT,
HENRY HASPER.